US005622246A

United States Patent [19]

Kubota

[11] Patent Number: 5,622,246

[45] Date of Patent: Apr. 22, 1997

[54] MECHANISM FOR TRANSPORTING CONNECTED STEPS

[76] Inventor: Masao Kubota, 22-7, Narimasu 2-chome, Itabashi-ku Tokyo, 175, Japan

[21] Appl. No.: 424,420

[22] PCT Filed: Aug. 31, 1994

[86] PCT No.: PCT/JP94/01440

§ 371 Date: Apr. 27, 1995

§ 102(e) Date: Apr. 27, 1995

[87] PCT Pub. No.: WO95/06612

PCT Pub. Date: Mar. 9, 1995

[30] Foreign Application Priority Data

| | | | |
|---|---|---|---|
| Sep. 2, 1993 | [JP] | Japan | 5-252058 |
| Aug. 15, 1994 | [JP] | Japan | 6-222348 |

[51] Int. Cl.[6] .......... B65G 17/00; B66B 21/00

[52] U.S. Cl. .......... 198/321; 198/333; 198/465.1; 198/465.2

[58] Field of Search .......... 198/333, 324, 198/321, 326, 528, 465.1, 465.2, 803.01

[56] References Cited

U.S. PATENT DOCUMENTS

| | | | |
|---|---|---|---|
| 3,547,286 | 12/1970 | LeBlond | 198/803.01 |
| 4,641,583 | 2/1987 | Harrington | 198/803.01 |
| 5,201,405 | 4/1993 | Noshi | 198/803.01 |
| 5,226,524 | 7/1993 | Cuttinger et al. | 198/803.01 |

FOREIGN PATENT DOCUMENTS

| | | | |
|---|---|---|---|
| 462878 | 6/1991 | European Pat. Off. . | |
| 0095095 | 4/1991 | Japan | 198/333 |

*Primary Examiner*—William E. Terrell
*Assistant Examiner*—Khoi H. Tran
*Attorney, Agent, or Firm*—Staas & Halsey

[57] ABSTRACT

Three continuous steps (1, 2, 3) of a transportation apparatus, adjoining in front and in rear, are connected to one another by parallel links, thereby forming one step group (123), so that the tread of each step is horizontal at all times. The step group (123), having reached the terminal end of a first stroke track (01), is delivered from the stroke track (01) onto a carriage (7) in engagement with a guide groove (03) as friction wheels (91, 92) rotate. The step group (123) on the carriage (7) is transversely transferred together with the carriage (7) along a circuit which is formed of the guide groove. Then, as friction wheels (93, 94) rotate, the step group (123) on the carriage (7) is delivered to the starting end of a second stroke track (02), and travels in the opposite direction on the stroke track (02). While this is done, the direction of the one step group itself is not changed.

9 Claims, 8 Drawing Sheets

MECHANISM FOR TRANSPORTING CONNECTED STEPS

TECHNICAL FIELD

The present invention relates to a continuous transportation apparatus, such as an escalator, moving footway, etc., in which the direction of its steps themselves cannot be changed when the steps are transversely transferred after being disengaged from the terminal end of a forward-stroke track and switched to the starting end of a backward-stroke track which extends parallel to the forward-stroke track, and more particularly, to a continuous transportation apparatus in which a plurality of steps, adjoining one another in front and in rear, are formed into one unit step group by means of a connecting mechanism, and the entire unit step group is transferred and switched from the terminal end of the forward-stroke track to the starting end of the backward-stroke track without changing the direction of itself.

BACKGROUND ART

Disclosed in Japanese Patent Applications published as KOKOKU Nos. 46-33107, 46-33108 and 46-33109 are continuous transportation apparatuses which are arranged as follows: When one step traveling on a first stroke track reaches the terminal end of the track, the step is disengaged from this stroke track and transported toward the starting end of a second stroke track which extends parallel to the first stroke track. Then, the transferred step is set on the second stroke track, and travels on the second stroke track in the direction opposite to the direction of the travel on the first stroke track. These apparatuses are designed so that the direction of the step itself cannot be changed during the travel of the step on the first and second stroke tracks.

As described above, however, all these conventional continuous transportation apparatuses are constructed in a manner such that steps are allowed to travel one by one on the stroke track, and the steps at the terminal end of the first stroke track are transferred one by one from this stroke track to the starting end of the second stroke track via a curved connecting track.

Incidentally, a large-sized object, such as a wheelchair, cannot be carried by means of only one step, requiring use of a plurality of continuous steps, e.g., three in number, adjoining in front and in rear. In the aforementioned conventional continuous transportation apparatuses, however, each three adjacent steps on the first and second stroke tracks are oriented oppositely in the vertical direction, with the result that such a mechanism for loading a wheelchair cannot be incorporated into the above transportation apparatus for inappropriateness in order of step arrangement.

DISCLOSURE OF THE INVENTION

The object of the present invention is to provide a continuous transportation apparatus in which an object to be transferred, such as a wheelchair, is carried on a unit step group which is formed of a plurality of steps adjoining one another in front and in rear, runs in one direction on a first stroke track is then disengaged from this stroke track at the terminal end thereof, and further the unit step group is fed transversely, is transferred to a second stroke track which extends parallel to the first stroke track, and runs on this stroke track in the direction opposite to the aforesaid direction, in a manner such that the order of vertical arrangement of the steps which constitute the unit step group is maintained so as not to be changed.

In order to achieve the above object, according to the present invention, there is provided a continuous transportation apparatus travelling forward and backward of a type such that a first stroke track (forward-stroke track) and a second stroke track (backward-stroke track), adapted to travel in opposite directions, are arranged parallel to each other, and the steps are transferred from the stroke track end on the one side to the track end on the other side without changing the direction of the steps themselves. In this apparatus, two or more steps are successively connected by means of a parallel link mechanism to form one unit step group to be transferred, the step at each end of each unit step group is fitted with a cylindrical surface whose center is on the center of a pin of its corresponding parallel link and whose radius is half the length of the link, the cylindrical surface serving as a contact surface between the unit step groups, each step is provided with a pair of wheels so that each step is set on the track. Also, the apparatus comprises a guide groove for guiding tread leveling rollers attached to at least one step of each unit, a mechanism for intermittently circulating a plurality of moving rail carriages capable of carrying the unit step groups by parallel movement in a rectangular parallelepiped region adjacent to the respective ends of the forward-stroke track and the backward-stroke track, a mechanism for quickly feeding the unit step groups to tile moving rail carriages at a controlled speed, thereby loading the carriages, and a mechanism for quickly transversely feeding the moving rail carriages at a controlled speed, then disengaging the unit step groups from the carriages at a controlled speed, and causing the steps to catch up with and be pressed against ones which precede them.

According to the present invention, as described above, only a simple mechanism attached to each step enables a plurality of steps to be transferred from one stroke track to the other stroke track without changing the direction of the steps themselves and the order of the composite step groups. Even though the traveling direction is changed, therefore, the direction of the step groups themselves and the order of the composite step groups can be prevented from being changed during this process.

BEST MODE FOR CARRYING OUT THE INVENTION

The following is a description of an escalator, as an embodiment of a continuous transportation apparatus according to the present invention, which uses three adjacent wide steps to transport a wheelchair.

Figure 1:
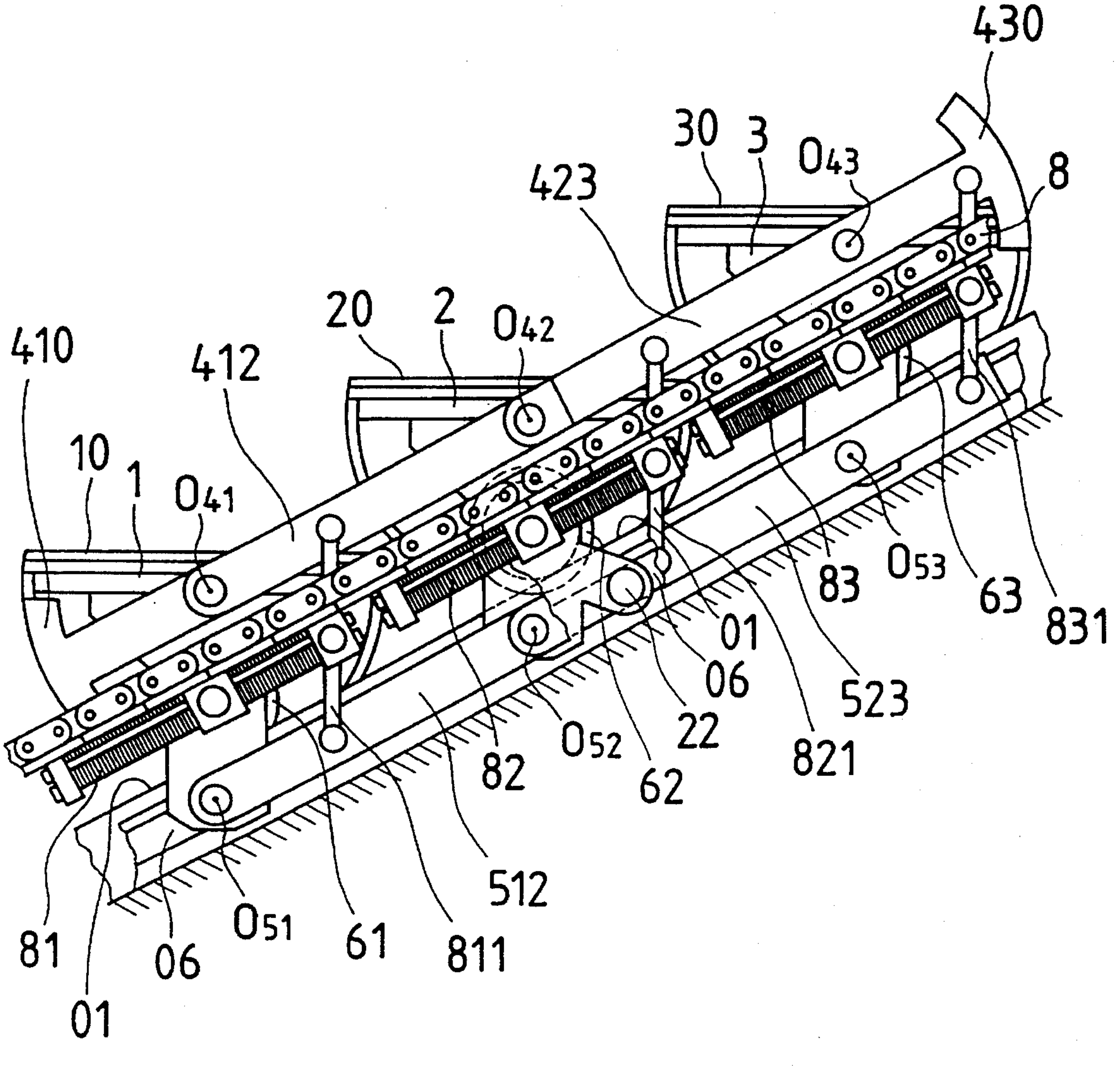
FIG. 1 is a side view of a unit step group which constitutes a continuous transportation apparatus according to one embodiment of the present invention.

FIG. 1 is a side view showing an example of a unit step group 123 traveling on an ascending forward-stroke track 01. This unit step group 123 is composed of three steps in total and connecting means formed of parallel links connecting them, the steps including one step 2 and steps 3 and 1 in front and in rear, respectively, of the step 2 as viewed in the traveling direction thereof.

The steps 1 and 2 are pinned to parallel links which are composed of an upper link 412 and a lower link 512. A distance L between centers of two pins which penetrate the upper link 412 (distance between centers $O_{41}$ and $O_{42}$) is equal to a distance between centers of two pins which penetrate the lower link 512 (distance between centers $O_{51}$ and $O_{52}$) (=L). Moreover, the rear end of the upper link 412 integrally forms an arcuate abutting portion 410 whose outer surface is an arcuate surface having its center on the center $O_{41}$ and a radius of (L/2−P) (where P is a positive or negative value including zero whose absolute value is smaller than L/2).

Also, the steps 2 and 3 are pinned to parallel links which are composed of an upper link 423 and a lower link 523. A distance between centers of two pins which penetrate the upper link 423 (distance between centers $O_{42}$ and $O_{43}$) is equal to a distance between centers of two pins which penetrate the lower link 523 (distance between centers $O_{52}$ and $O_{53}$), and both these values are equal to the aforesaid value L. Moreover, the front end of the upper link 423 integrally forms an arcuate abutting portion 430 whose outer surface is an arcuate surface having its center on the center $O_{43}$ and a radius of (L/2+P).

As described above, three steps 1, 2 and 3, adjoining one another in front and in rear, are connected to one another into one unit step group 123 by means of the two sets of parallel links. The step unit group 123 on a stroke track is arranged so that its front arcuate abutting portion 430 is in contact with the rear arcuate abutting portion 410 of another unit step group 123 traveling ahead, and that its rear arcuate abutting portion 410 is in contact with the front arcuate abutting portion 430 of another unit step group 123 traveling behind. When a plurality of unit step groups 123 are arranged in a straight line on the stroke track, the distance between the center $O_{41}$ of a preceding step group 123 and the center $O_{43}$ of the immediately succeeding step group 123 is [L/2−P]+[L/2+P]=L, which is equal to the distance between centers of the two pins penetrating the upper link 412 which constitutes the parallel links (distance between the centers $O_{41}$ and $O_{42}$) and to the distance between centers of the two pins penetrating the upper link 423 (distance between the centers $O_{42}$ and $O_{43}$). It should be noted, however, that the value P is zero (P=0) in the present embodiment.

The circular arc length of the front and rear arcuate abutting portions 430 and 410 of each unit step group 123 is adjusted to a length so that the contact between the arcuate abutting portions 430 and 410 can be maintained even though the unit step group 123 just ahead of or behind a certain unit step group 123 is bent to a maximum degree with respect to the latter.

Figure 3:
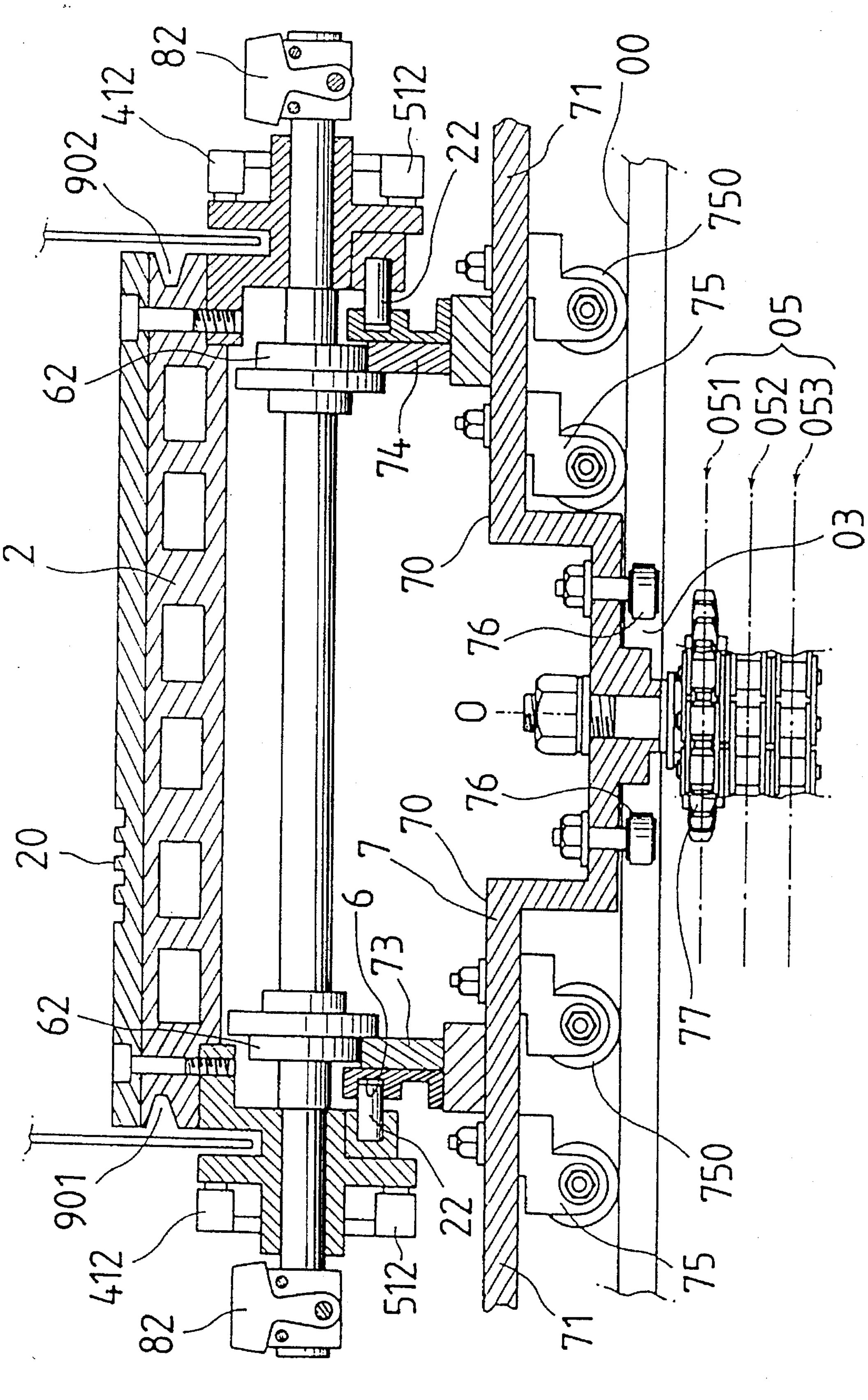
FIG. 3 is a front view of a carriage loaded with the unit step group of FIG. 1.

As is also shown in FIG. 3, the steps 1, 2 and 3 which constitute the unit step group 123 are provided with collared wheels 61, 62 and 63, respectively. These wheels 61, 62 and 83 are on the forward-stroke track 01 or backward-stroke track 02. The step 2 in the center is provided with a pair of tread leveling pins 22 on the left and right thereof, individually, with respect to its advancing direction, whereby its tread 20 is kept level. As the pins 22 are fitted individually in recessed grooves 06 which are formed in the forward- and backward-stroke tracks 01 and 02, individually, the unit step group 123 can be securely guided by the stroke tracks 01 and 02. If the tread 20 of the center step 2 is kept level, then the respective treads 20 of the two other steps 1 and 3, which are connected with the parallel links, are also kept level by the parallel links at the same time.

Moving handrails (not shown) are located above and outside the forward- and backward-stroke tracks 01 and 02, and parallel link mechanisms are housed in spaces under the moving handrails.

The unit step group 123 is driven by a step driving chain 8, i.e., a roller chain traveling outside and over the stroke tracks 01 and 02, as it travels on the stroke tracks 01 and 02 by the collared wheels 61, 62 and 63. According to the present embodiment, power is transmitted from the driving chain 8 to the unit step group 123 through power transmission devices, such as a passive medium described in detail in an International Application published as No. WO 93/22231. Since what type of the passive media should be used does not become an issue in the present invention, it will be described only in brief herein. Passive medium holders are attached individually to vertical links 811, 821 and 831 stretched between the upper links 412 and 423 and the lower links 512 and 513 which constitute the parallel links. The passive medium holders individually hold passive media 81, 82 and 83 which are formed by lapping a large number of rigid leaves. As the traveling step driving chain 8 (more specifically, indentations formed on left- and right-hand link plates of the chain 8) engages the upper side of the passive media 81, 82 and 83 (rigid leaves) in the passive medium holders, the traveling power is transmitted from the chain 8 to the unit step group 123 through the passive media.

Figure 2A:
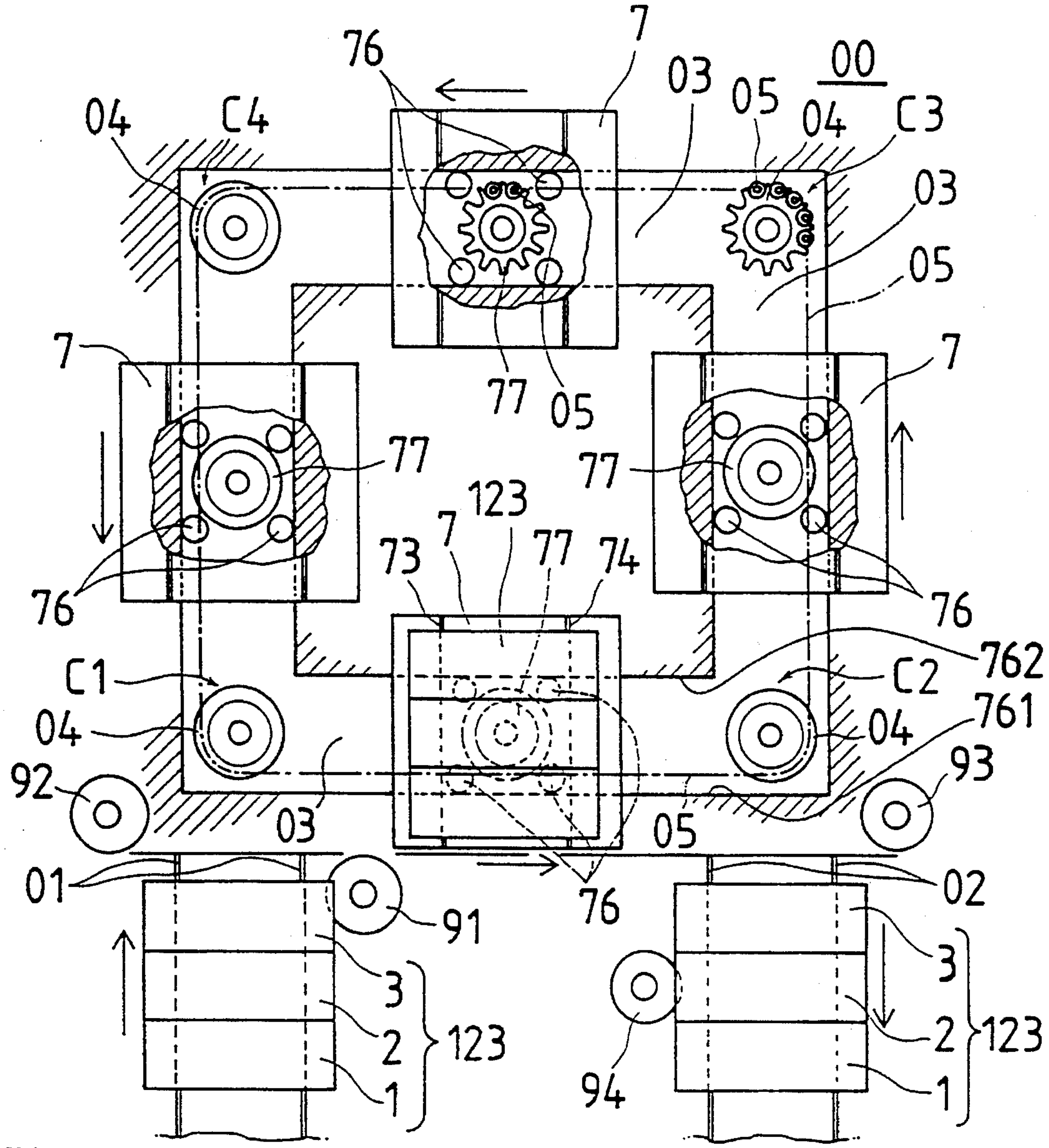
FIGS. 2(*a*) and 2(*b*) show a switch associated section which constitutes the continuous transportation apparatus, in which FIG. 2(*a*) is a plan view of this section and FIG. 2(*b*) is a diagram for illustrating the operation of the unit step group in the switch associated section.
Figure 2B:
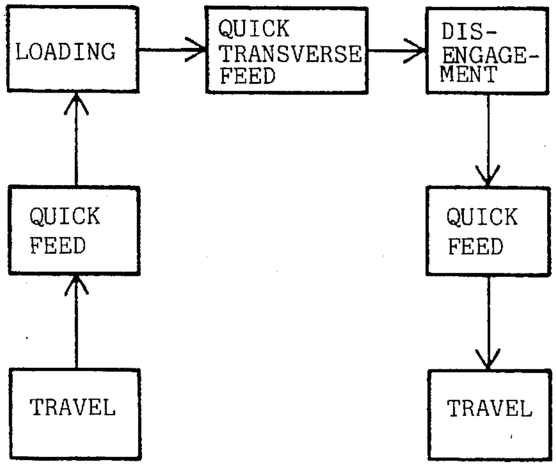
Figure 4:
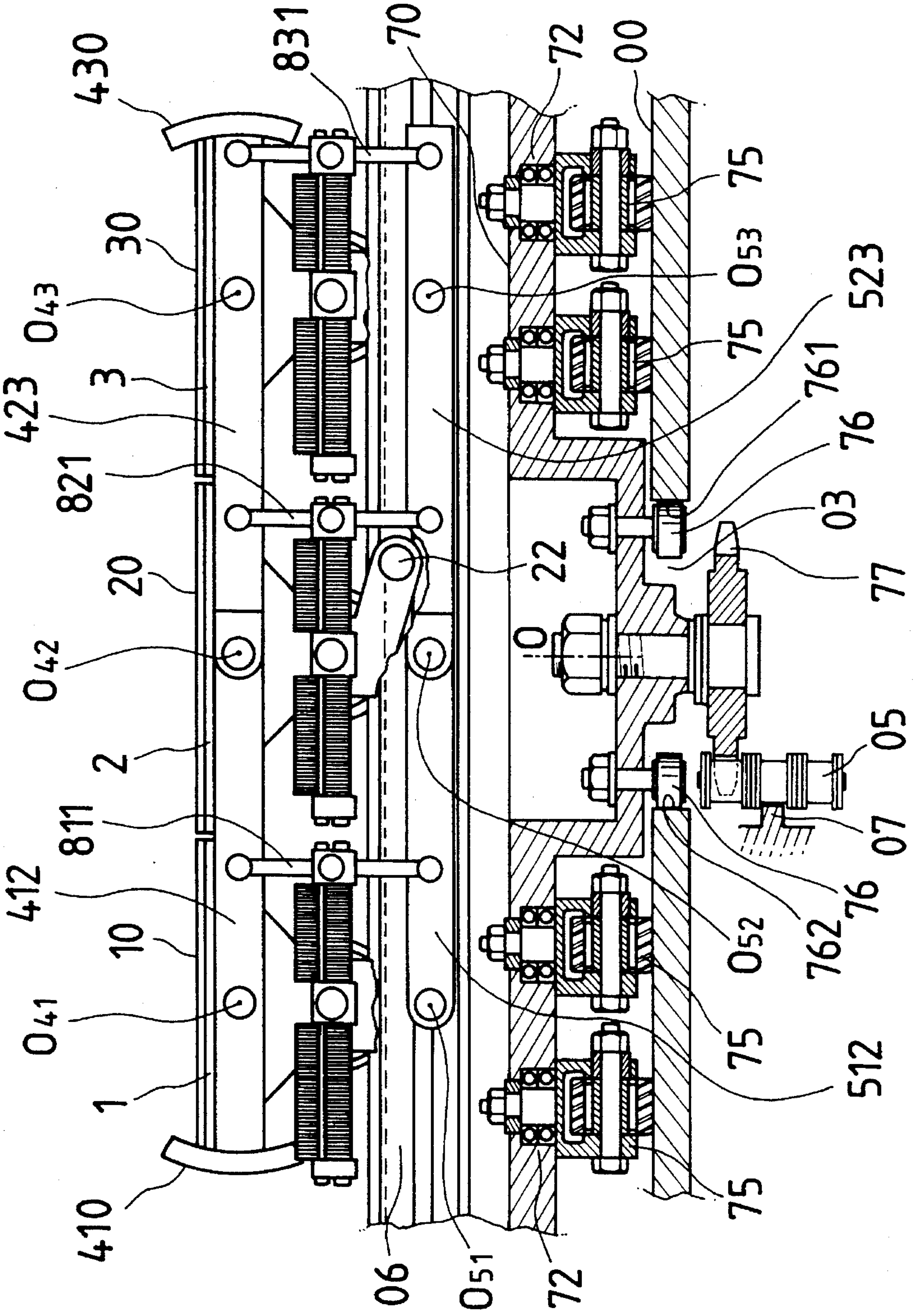
FIG. 4 is a side view of the carriage.

Referring now to FIGS. 2, 3 and 4, an arrangement of a switch mechanism associated section for disengaging the unit step group 123 from the terminal end of the forward-stroke track 01 and switching it to the starting end of the backward-stroke track 02 will be described. FIG. 2(*a*) is a plan view of the switch mechanism associated section, and FIG. 2(*b*) is a diagram for illustrating the operation of the unit step group 123.

A carriage 7 for carrying the unit step group is used to receive the unit step group 123 disengaged from the terminal end of the forward-stroke track 01 and transfer it to the starting end of the backward-stroke track 02 without changing the direction of the unit step group 123 itself. In this carriage 7, as shown in the front view of FIG. 3 and the side view of FIG. 4, moving rails 73 and 74 are mounted on the upper surface of a flat plate 70 which has lower ribs 71 and 72, and a plurality of casters 75 are mounted on the lower surface of the flat plate 70. When the unit step group 123 is on the carriage 7, the wheels 61, 62 and 63 of its individual steps are on the moving rails 73 and 74 of the carriage 7, as shown in FIG. 3.

Figure 5A:
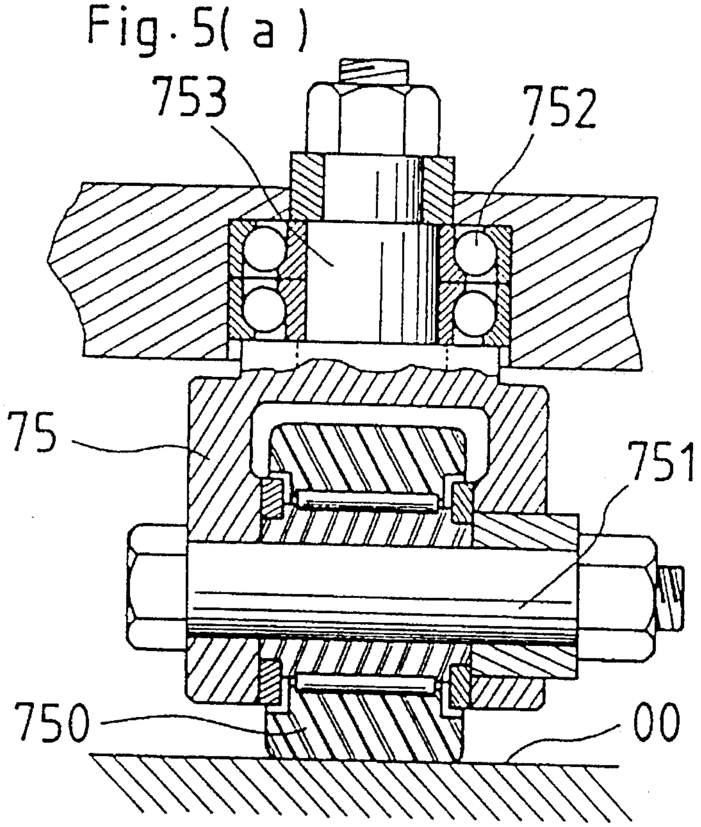
FIGS. 5(*a*) and 5(*b*) are views showing a caster of the carriage of FIG. 3, in which FIG. 5(*a*) is a front view and FIG. 5(*b*) is a side view.
Figure 5B:
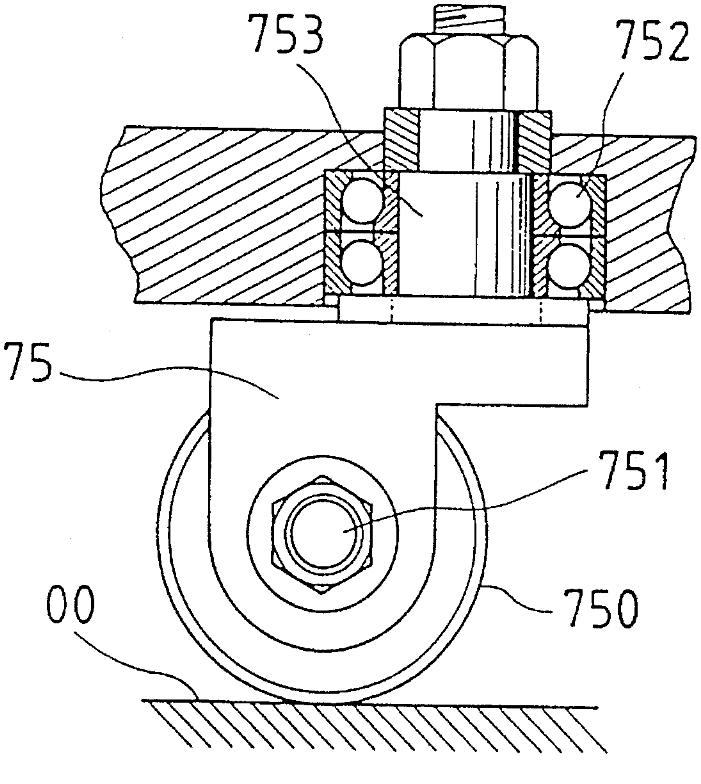

In each caster 75, as shown in the front view of FIG. 5(*a*) and the side view of FIG. 5(*b*), a roller 750 is rotatably supported around a horizontal shaft 751. Preferably, the roller 750 should be crowned. As shown in FIG. 5(*b*), a vertical shaft 753, which supports the horizontal shaft 751 on the flat plate 70 for rotation on a horizontal plane by means of a rolling bearing 752, is not positioned right over the horizontal shaft 751, but is offset for a certain distance with respect to the roller 750. When the carriage 7 moves in a certain direction, therefore, the horizontal shaft 751 never fails to be directed at right angles to this moving direction, so that the movement of the carriage 7 becomes smooth. FIG. 3 is a view showing a situation where the carriage 7, which carries thereon the unit step group 123 including the step 2, moves from left to right as illustrated, and FIG. 4 is a view showing a situation where the carriage 7 moves in the direction perpendicular to the drawing plane.

As shown in FIGS. 3 and 4, guide rollers 76 . . . are mounted on the central portion of the carriage 7, in four positions, left, right, front, and rear, around a central axis 0. Under the central portion of the carriage 7, moreover, a sprocket 77 is fixed to the lower end of a fixed shaft whose axis is in alignment with the central axis 0 in a manner such that it is prohibited from rotating.

On the other hand, a horizontal floor 00 connects with the respective ends of the forward-stroke track 01 and the backward-stroke track which extend parallel to each other. As shown in FIG. 2, the horizontal floor has a guide groove 03 in the form of a circuit with a predetermined width. The center line of the guide groove 03 generates a square which connects four points C1, C2, C3 and C4 in FIG. 2.

As shown in FIG. 2, all of the four guide rollers 76 . . . of the carriage 7 are guided by inside wall surfaces 761 and 762 of the guide groove 03 when the carriage 7 moves from the point C1 toward the point C2 or from the point C3 toward the point C4 (or advances in a direction perpendicular to the advancing directions of the stroke tracks 01 and 02, that is, moves transversely) or when the carriage 7 moves from the point C2 toward the point C3 or from the point C4 toward the point C1 (or advances in a direction perpendicular to the direction from C1 to C2).

Figure 6A:
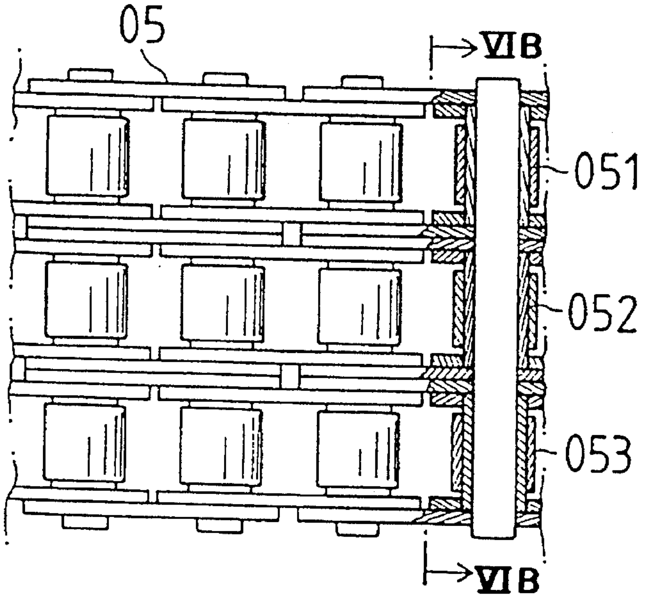
FIGS. 6(*a*) and 6(*b*) are views showing a triple roller chain used in the switch associated section of FIG. 2, in which FIG. 6(*a*) is a side view and FIG. 6(*b*) is a plan view taken along line VIB—VIB of FIG. 6(*a*).
Figure 6B:
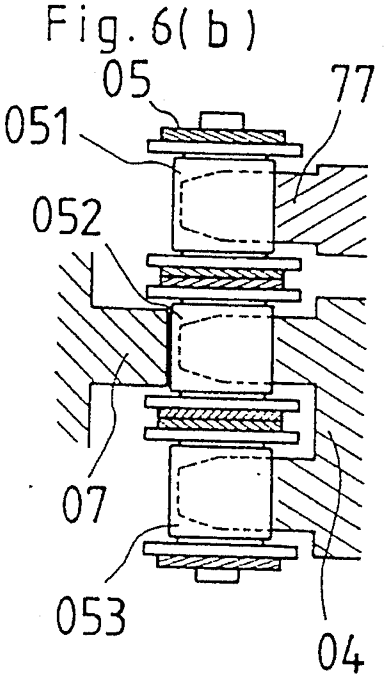

Moreover, double-row sprockets 04 are arranged individually in positions corresponding to the four points C1, C2, C3 and C4 in the guide groove 03. The double-row sprocket 04 engages with lower rows 052 and 053 of an endless triple roller chain 05, such as the one shown in FIG. 6, so that the roller chain 05 is passed around and between the four sprockets 04. Thus, when one of the sprockets 04 is rotated, the roller chain 05 travels, so that the remaining three sprockets 04 also rotate. Alternatively, a plurality of sprockets 04 may be rotated synchronously.

An upper row 051 of the triple roller chain 05 engages with the sprocket 77 which is attached to the lower central portion of each carriage 7. When the roller chain 05 travels, therefore, the carriage 7 also moves at the same speed. The roller chain 05 is prohibited from being disengaged from the sprockets 04 and 77 in a manner such that center-row rollers 052 of the roller chain 05 are pressed by roller retainers 07 which protrude from the inside surfaces 751 and 762 of the guide groove 03 in the horizontal floor 00.

Figure 7:
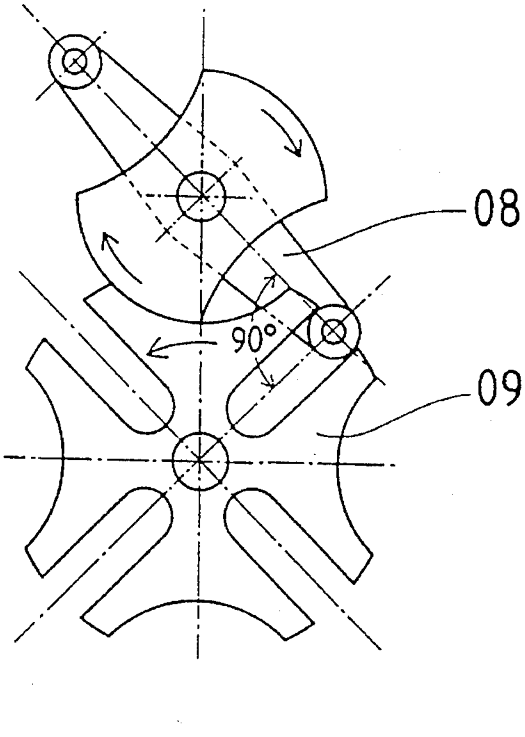
FIG. 7 is a plan view of a dual-pin-drive Malta-cross mechanism.

Since all the sprockets 04 and 77 which engage the individual rows of the triple roller chain 05 have the same shape and size, each carriage 7 can change its direction at right angles at the corners (positions of the points C1, C2, C3 and C4) of the groove 03. If the carriage 7 lowers its traveling speed when it reaches a position near a corner of the circuit, it can be fully restrained from going beyond the corner due to inertia from at least one of the four sprockets 04 which are located in the positions of the corner points C1, C2, C3 and C4. The highest degree of freedom can be obtained if the speed of the sprocket is controlled by means of a control motor which is used in combination with a program controller. If one sprocket is driven by using a Malta-cross wheel 09 which is driven by means of a dual-pin wheel 08 shown in FIG. 7, 90° nonconstant-speed rotation and 90° pause are repeated mechanically, although the situation of speed change is restricted. If a suitable speed change gear is used in combination with this, therefore, the sprocket can be driven in a substantially desired state.

If the distance between the forward- and backward-stroke tracks 01 and 02 is wide, as in the case where the escalator as the continuous transportation apparatus according to the embodiment of the present invention is provided on either side of a wide staircase for walking, it is necessary only that the distance between the points C1 and C2 of the circuit be a value obtained by multiplying each stroke of the unit step group carriage 7 by an integer.

As shown in FIG. 2(*a*), friction transmitting wheels 91, 92; and 93, 94 are provided outside the forward-stroke track 01, left and right, near the terminal end of the forward-stroke track 01, and outside the backward-stroke track 02, left and right, near the starting end of the backward-stroke track 02, respectively. The outer periphery of each of these friction transmitting wheels 91, 92, 93, 94 has a V-shaped profile. As shown in FIG. 3, on the other hand, V-grooves 901 and 902 are formed on the left- and right-hand sides, respectively, of each of the steps 1, 2 and 3 which constitute the unit step group 123. As the respective outer peripheries of the friction transmitting wheels 91 and 92, being rotated at high speed, are forced into the V-grooves 901 and 902 in the steps 1, 2 and 3 which constitute the unit step group 123, the unit step group 123, having reached a position near the terminal end of the forward-stroke track 01, is delivered at high speed in its traveling direction from the forward-stroke track 01, and is quickly transferred to the carriage 7 which has just reached the point C1. When the carriage 7 is on the point C1, the moving rails 73 and 74 of the carriage 7 are situated on the extension of the forward-stroke track 01, so that the unit step group 123 travels on the moving rails 73 and 74 after traveling on the forward-stroke track 01.

The unit step group 123, having been thus placed on the moving rails 73 and 74 of the carriage 7 on the point C1, is transported from the point C1 to the point C2 as the triple roller chain 05 travels, that is, through the engagement between the sprocket 77 of the carriage 7 and the upper row 051 of the triple roller chain 05. When the carriage 7 reaches the point C2, the respective outer peripheries of the friction transmitting wheels 93 and 94 are forced into the V-grooves 901 and 902 in the steps 1, 2 and 3 which constitute the unit step group 123 on the carriage 7, and the friction transmitting wheels 93 and 94 rotate at high speed. Thereupon, the unit step group 123 on the moving rails 73 and 74 of the carriage 7 is quickly transferred from the position of the point C2 to the backward-stroke track 02. Also at this time, the carriage 7 on the point C2 is situated on the extensions of the moving rails 73 and 74.

The rotating speed of the friction transmitting wheels 91, 92, 93, 94 is controlled by means of a control motor. It is advisable to provide the carriage 7 with wheel stopper means which prevents the unit step group 123 on the moving rails 73 and 74 from going too far when the unit step group 123 is to be transferred from the forward-stroke track 01 to the moving rails 73 and 74 on the carriage 7 by driving the friction transmitting wheels 91 and 92.

According to the present embodiment, as described above, N number (N=3) of steps 1, 2 and 3 are formed into the unit step group 123, and each unit step group 123 is switched from the forward-stroke track 01 to the moving rails 73 and 74 on the carriage 7 or from the moving rails 73 and 74 on the carriage 7 to the backward-stroke track 02. If the time required for the one step 1 which constitutes the unit step group 123 to pass over the stroke tracks 01 and 02 is T, a time To required for the unit step group 123 itself to pass over the forward-stroke track 01 is T×N. This indicates that switching of each unit step group 123 must be completed only within the time To (=T×N).

If the distance between the respective center lines of the forward- and backward-stroke tracks 01 and 02 is short, a process for delivering one unit step group 123 from the forward-stroke track 01 to the moving rails 73 and 74 on the carriage 7 on the point C1 and a process for delivering the immediately preceding unit step group 123 from the moving rails 73 and 74 on the carriage 7 on the point C2 to the backward-stroke track 02 are executed simultaneously, so that the delivery of the unit step groups 123 between the stroke tracks 01 and 02 and the moving rails 73 and 74 on the carriages 7 can be carried out without interruption.

Thus, if the delivery of the unit step groups 123 between the forward- and backward-stroke tracks 01 and 02 and the carriages 7 are carried out to advance the processes without interruption while the carriages 7 carrying the unit step groups 123 thereon move transversely, in the case where the distance between the respective center lines of the stroke tracks 01 and 02 is short, the time of transverse movement of the unit step groups 123 and the time of delivery of the unit step groups 123 between the stroke tracks 01 and 02 and the carriages 7 have the same value NT/2. Thus, these times are equal to half (To/2) of the time To (=T×N) for the passage of the unit step groups 123 over the stroke tracks.

In this case, the standard speed of the escalator is adjusted to 30 meters per minute. If the depth and width of the tread of each of the steps 1, 2 and 3 are 40 cm and 100 cm, respectively, the time T required for each of the steps 1, 2 and 3 to pass over the stroke tracks 01 and 02 is $$T=40/(30\times100/60)=0.8\ sec.$$

The time (To/2) for the delivery of each unit step group 123, including three adjacent steps (N=3) of the same size, between the stroke tracks 01 and 02 and the moving rails 73 and 74 of the carriage 7 is $$To/2=T\times N/2=1.2\ sec.$$

This time (To/2=1.2 sec) is equal to the time of transverse movement of the unit step group 123 on the carriage 7, as mentioned before. The distance between the respective center lines of the forward- and backward-stroke tracks 01 and 02 is expected to range from 1,400 to 1,500 mm. As seen from these circumstances, the three steps each having the depth of 40 cm must cover a distance of 3×40=120 cm and, at the same time, achieve a transverse movement of 140 cm or more in 1.2 sec. In other words, the delivery of the unit step group 123 between the stroke tracks 01 and 02 and the moving rails 73 and 74 on the carriage 7 and the transverse movement of the unit step group 123 on the carriage 7 must be executed at a speed of about 1 m per second (60 m per minute). In moving the unit step group 123 between the forward- and backward-stroke tracks 01 and 02 in one process, therefore, the mass of the moving body must be adjusted to as small a value as possible which is suited for the guide mechanism and speed control. If the distance between the respective center lines of the forward- and backward-stroke tracks 01 and 02 is long, however, the transverse movement of the unit step group 123 on the carriage 7 can be executed in a plurality of transverse movement processes. In this case, the trace of movement of the carriage 7 has a transversely elongated rectangular shape.

According to the embodiment described above, the carriage 7 is circulated along the right-angled tetragon under the floor 00 which adjoins the respective end portions of the two stroke tracks 01 and 02 arranged parallel to each other. Although the floor base for the formation of the circuit need not be deep, in this case, a pretty wide floor space is required for the formation of the circuit. Depending on the construction of the building, therefore, installation of the circuit of this type may be difficult or impossible.

Figure 8:
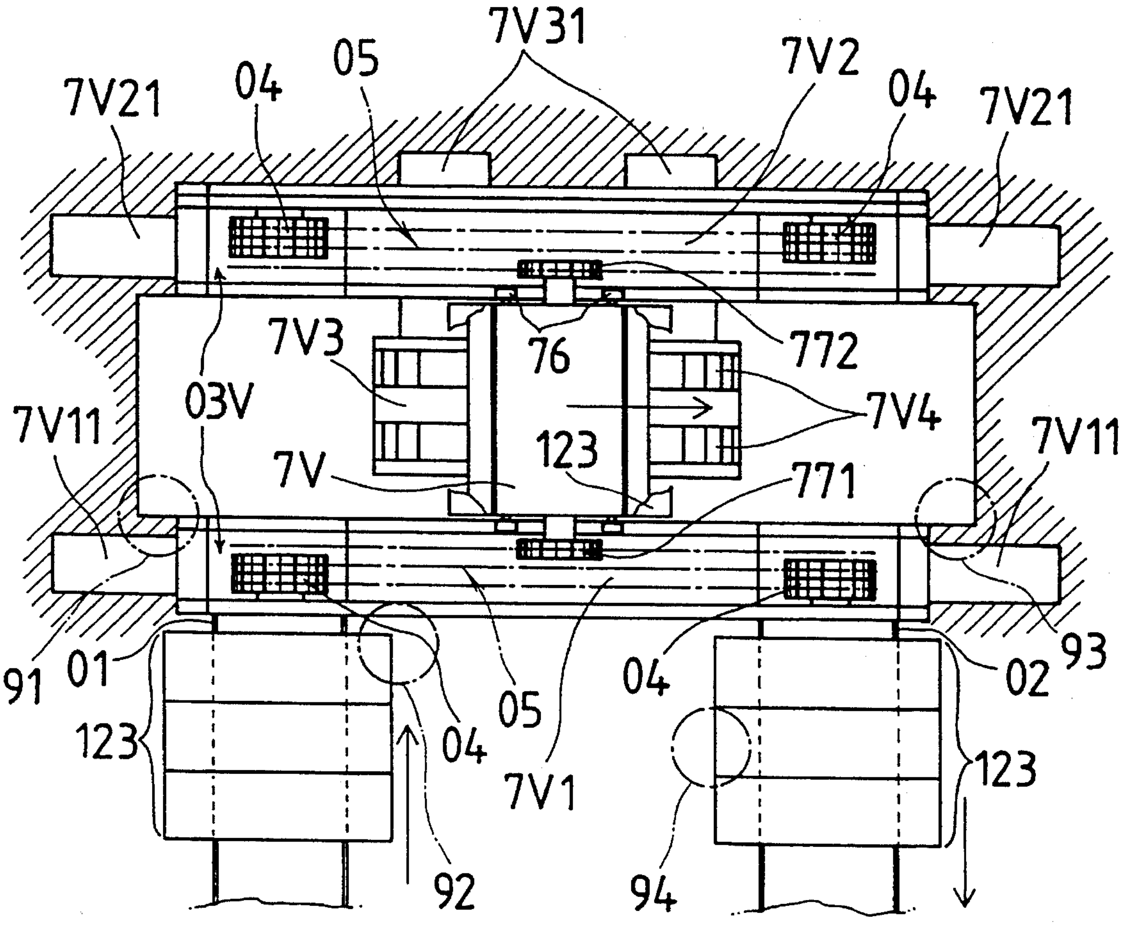
FIG. 8 is a plan view of a vertical-type switch associated section according to an embodiment different from the embodiment of the switch associated section of FIG. 2.
Figure 9:
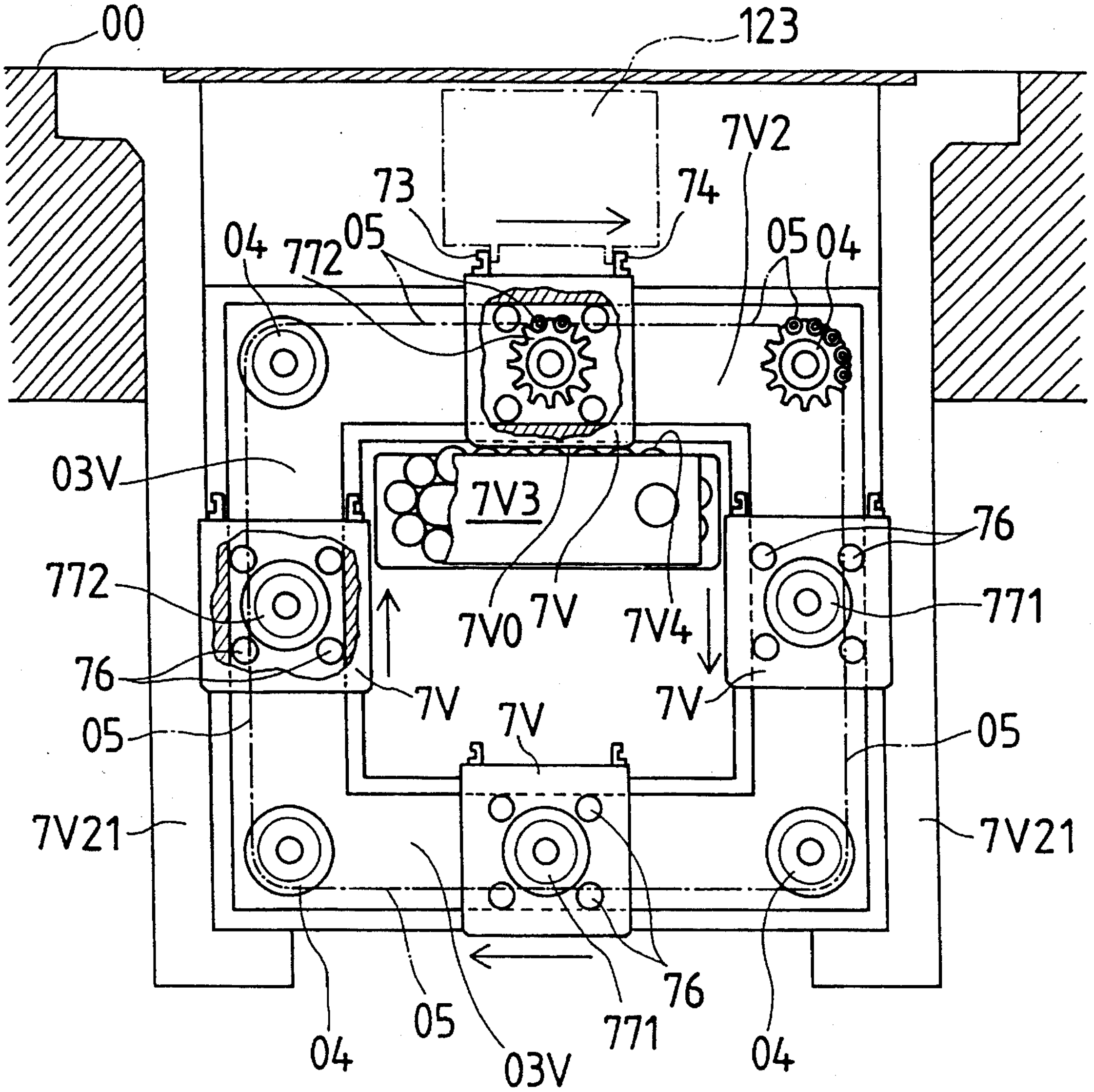
FIG. 9 is a front view of the switch associated section of FIG. 8.

The plan view of FIG. 8 and the front view of FIG. 9 show an arrangement as a substitute for the aforesaid arrangement, in which a circuit for circulating the carriage 7 along a right-angled tetragon on a vertical plane is provided at the end portions of the stroke tracks 01 and 02.

Also in this embodiment, a mechanism for moving the carriage along the groove circuit and a mechanism for delivering the unit step group 123 between the stroke tracks 01 and 02 and the moving rails 73 and 74 on the carriage are basically the same as those of the foregoing embodiment. In the following, therefore, this embodiment will be described only in brief.

According to this embodiment, the circuit is formed in a manner such that two carriage guide mechanisms (inside and outside), as structures in which the center line of a guide groove having a predetermined width in the vertical and horizontal directions generates a right-angled tetragon on a vertical plane, are opposed to each other across a certain space in the traveling direction of the stroke tracks 01 and 02. In the plan view of FIG. 8, symbols 7V1 and 7V2 designate the inside and outside carriage guide mechanisms, respectively, and FIG. 9 shows a front view of the outside carriage guide mechanism 7V2 out of these mechanisms.

The inside and outside guide mechanisms 7V1 and 7V2 have the same construction. The center line of guide grooves 03V has the shape of a right-angled tetragon, and double-row sprockets 04 . . . are arranged individually in positions corresponding to the corners of the right-angled tetragon of each guide groove 03V. Two rows of an endless triple roller chain 05 are in engagement with these double-row sprockets 04 . . . The guide mechanisms 7V1 and 7V2 themselves are suspended from the horizontal floor 100 by means of hangers 7V11 and 7V21, respectively.

Each of carriages 7V to be transferred by means of the aforesaid guide mechanisms 7V1 and 7V2 has horizontal shafts projecting individually from the front and rear portions of its body in the horizontal direction, and fixed sprockets 771 and 772 are fixed individually to the extreme ends of the shafts. The one fixed sprocket 771, out of the fixed sprockets 771 and 772 of each carriage 7V, engages one row of the triple roller chain 05 of the inside guide mechanism 7V1, while the other sprocket 772 engages one row of the triple roller chain 05 of the outside guide mechanism 7V2. Thus, as the triple roller chains 05 travel, the carriages 7V are transferred along the guide grooves 03 of the circuit.

Further, each carriage 7V has four horizontal shafts fitted on the front and rear portions of its body and rotatably supporting guide rollers 76 . . . which engage left- and right-hand or upper and lower inside wall surfaces 761 and 762 of the guide groove 03V.

As shown in FIG. 9, moreover, a circulation-type linear roller guide 7V3 is provided in a position under the carriage 7V in transverse movement so that its upper surface is in contact with the lower side face of the body of the carriage 7V. It bears the weight of the carriage 7V which carries the unit step group 123 thereon. This linear guide roller 7V3 serves to prevent the carriage 7V being transferred transversely (horizontally) in the circuit from dropping from the guide groove 03V in the middle. As shown in FIG. 8, the linear roller guide 7V3 is supported by the support fittings 7V31 which are embedded in the floor.

The above is a description of the first embodiment in which the circuit for circulating the carriages 7 along the right-angled tetragon on the horizontal plane is provided at the end portions of the stroke tracks 01 and 02, and the second embodiment in which the circuit for circulating the carriages 7V along the right-angled tetragon on the vertical plane is provided. These embodiments may be alternatively used in consideration of the storage space (horizontal-plane space or vertical-plane space). In the case where the forward- and backward-stroke tracks are on ascending and descending slopes, respectively, the circuits according to the first and second embodiments can be used as a downstairs circuit (at the starting end of the forward-stroke track or the terminal end of the backward-stroke track) and an upstairs circuit (at the terminal end of the forward-stroke track or the starting end of the backward-stroke track), respectively.

The unit step group 123 is provided with the parallel links on either side, whereby the treads of a plurality of steps which constitute the group can be kept horizontal. If the width of steps is narrow, however, the parallel links may be arranged only on one side. According to the present embodiment, moreover, the unit step group is composed of three steps. Alternatively, however, the unit step group 123 may be composed of two steps.

According to the present invention, the switching from one stroke track to another stroke track can be executed without changing the direction of the steps themselves by silent reliable operation only using a simple mechanism attached to each step.

I claim:

1. A continuous transport apparatus, comprising:

a plurality of unit step groups, each unit step group formed of a plurality of steps and having a front and a rear;

connecting mechanisms for connecting the plurality of steps in the unit step group;

a first stroke track having a terminal end;

first unit step running means for transferring unit step groups on the first stroke track such that the rear of each unit step group is in contact with the front of another unit step group and the front of each unit step group is in contact the rear of another unit step group;

a second stroke track aligned parallel to the first stroke track and having a starting end;

second unit step running means for transferring unit step groups on the second stroke track such that the rear of each unit step group is in contact with the front of another unit step group and the front of each unit step group is in contact the rear of another unit step group, the unit step groups being transferred on the first and second stroke tracks while being oriented to extend in a first direction, parallel to the first and second stroke tracks;

a circuit forming a looped connection between the terminal end of the first stroke track and the starting end of the second stroke track;

a carriage for transporting one unit step group of the plurality of unit step groups, on the circuit from the terminal end of the first stroke track to the starting end of the second stroke track, the carriage being oriented to extend in a second direction;

carriage driving means for circulating the carriage through the looped connection of the circuit while maintaining the orientation of the carriage in the second direction; and unit step delivery means for delivering the unit step group from the terminal end of the first stroke track to the carriage and from the carriage to the starting the end of the second stroke track, the unit step delivery means delivering the unit step group while maintaining the orientation of the unit step group in the first direction.

2. A continuous transportation apparatus according to claim 1, wherein the connecting mechanism is formed of parallel links, each of said parallel links having front and rear abutting surfaces, and each step has wheels which ride on the first and second stroke tracks such that, when transferred by the first and second unit step running means, the rear abutting surface of each unit step group is in contact with the front abutting surface of another unit step group and the front abutting surface of each unit step group is in contact with the rear abutting surface of another unit step group.

3. A continuous transportation apparatus according to claim 2, wherein each step is supported by the parallel links with a pin, the step toward the front of each unit step group being supported by a front pin and the step toward the rear of each unit step group being supported by a rear pin, the front and rear abutting surfaces of said parallel links are arcuate surfaces around, and at radii from, axes defined respectively by the front and rear pins, and for each unit step group, the sum of the radii for the arcuate surfaces of said front and rear abutting surfaces is equal to the distance between the pins supporting steps which are adjacent in the unit step group.

4. A continuous transportation apparatus according to claim 1, wherein the continuous transport apparatus is positioned between two horizontal floors and said circuit is defined by a guide groove having a center line and a predetermined width, in one of the horizontal floors so that the center line of the guide groove forms a right-angled tetragon.

5. A continuous transportation apparatus according to claim 1, wherein the continuous transport apparatus is positioned between two horizontal floors and said circuit is defined by a guide groove having a center line and a predetermined width, the guide groove being oriented in a vertical direction so that the center line of the guide groove forms a right-angled tetragon in a vertical plane.

6. A continuous transportation apparatus according to claim 1, wherein said carriage driving means for circulating the carriage includes a mechanism for intermittently moving the carriage a unit distance, then pausing before again moving the carriage.

7. A continuous transportation apparatus according to claim 6, wherein the length of a transverse side of said right-angled tetragon is equal to the distance between the terminal end of said first stroke track and the starting end of said second stroke track, and is a value obtained by multiplying said unit distance for moving the carriage in the circuit, by an integer.

8. A continuous transportation apparatus according to claim 4, wherein said carriage driving means for circulating the carriage includes four sprockets with one sprocket being provided at each of the corners of said right-angled tetragon of the circuit, a chain engaged with and connecting each of the four sprockets and a rotating power supply adapted to move the chain in a fixed direction between the sprockets by supplying rotating power to at least one of the sprockets, the guide groove has side walls, the carriage has a guide sprocket surrounded by guide rollers, and the guide sprocket engages the chain and the guide rollers engage the side walls so that the chain moves the carriage and the side walls guide the carriage through the circuit.

9. A continuous transportation apparatus according to claim 5, wherein said carriage driving means for circulating the carriage includes four sprockets with one sprocket being provided at each of the corners of said right-angled tetragon of the circuit, a chain engaged with and connecting each of the four sprockets and a rotating power supply adapted to move the chain in a fixed direction between the sprockets by supplying rotating power to at least one of the sprockets, the guide groove has side walls, the carriage has a guide sprocket surrounded by guide rollers, and the guide sprocket engages the chain and the guide rollers engage the side walls so that the chain moves the carriage and the side walls guide the carriage through the circuit.

* * * * *